Sept. 11, 1962  H. S. HORN  3,052,917
PRODUCTION OF WRINKLE-FREE FILM
Filed Aug. 10, 1959
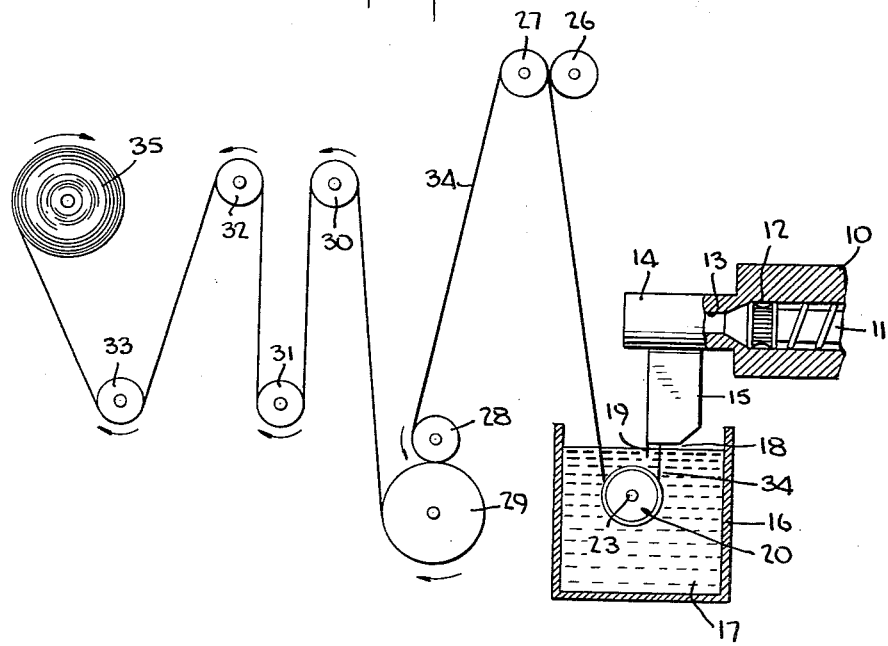
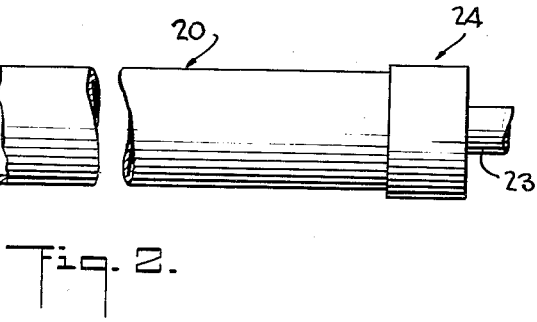

United States Patent Office 3,052,917
Patented Sept. 11, 1962

3,052,917
PRODUCTION OF WRINKLE-FREE FILM
Harvey S. Horn, Bronx, N.Y., assignor to Celanese Corporation of America, New York, N.Y., a corporation of Delaware
Filed Aug. 10, 1959, Ser. No. 832,647
14 Claims. (Cl. 18—15)

This invention relates to the extrusion of film, and more particularly to a process of and means for preventing the formation of wrinkles in extruded films such as films of high density polyolefin materials.

Films of high density polyolefin materials, such as polyethylene, polypropylene and the like, are prepared by forming a melt of the resin and extruding the melt through an enclosed path and through a die of predetermined opening. The film which ultimately leaves the die is passed through a small air gap and then immersed in a water bath maintained at a temperature considerably lower than that of the melt. In this manner the film is hardened, prior to being passed over and around a plurality of driven and idler rolls (located exteriorly of the water bath) which apply sufficient tension to the film to bring about a reduction of the film gauge to about 1 mil. The film in its final form is then wound onto a suitable take-up roll or spool for storage and/or shipment to the ultimate user thereof.

It has been found, however, that film processed in this manner tends to become wrinkled during the course of the tensioning and winding operations, as well as during the immersion stage, frequently to such an extent as to render it defective and unusable for its originally intended purpose. Generally, such wrinkles take the shape of diagonal lines starting at the center of the web and running out to the edges of the latter.

It is, therefore, an object of the present invention to improve the process of extruding resinous films in such a manner as to prevent the formation of wrinkles in the extruded film.

It is another object of the present invention to provide means which may be incorporated in a standard film extrusion system for the purpose of avoiding the formation of such wrinkles in the extruded film.

Still another object of the present invention is to provide a process of and means for preventing wrinkle formation in an extruded high density polyolefin film which entails overdriving the lateral edges of the film web relative to the central portion of the web as it passes through the cooling water bath.

Concurrently, it is an object of the present invention to provide, in conjunction with the water bath of a standard extrusion system, an idler roll located below the water level of the bath and about which the film is passed while in the bath, which idler roll comprises essentially a cylindrical body having its outermost ends built up or thicker as compared with the central portion of the body of the roll so as to impart to the lateral web edges engaging these ends a higher speed of travel than to the central portion of the web until the web has passed the idler roll.

The foregoing and other objects, characteristics and advantages of the present invention will become more fully clear from the following detailed description thereof when read in conjunction with the accompanying drawing, in which:

FIG. 1 is a schematic illustration of a film extrusion system equipped with a wrinkle-preventing roll constructed in accordance with the present invention; and FIG. 2 is a fragmentary, partly sectional view of the wrinkle-preventing roll.

Referring first to FIG. 1, it will be seen that the extrusion system according to the present invention comprises an extruder 10 in which is housed a rotatable extruder screw 11, the rear or inlet end of the extruder housing 10 being provided with a hopper or like structure (not shown) through which the source resin may be introduced into the extruder. Arranged within the extruder housing 10 at the front end thereof and adjacent the discharge end of the screw 11 is a pack of mesh screens and a breaker plate, indicated collectively by the reference numeral 12, through which the resin is adapted to be forced into a passageway 13 of an attachment 14 to which is attached a die 15. The interior of the die communicates with the passageway 13 and provides a converging or narrowing flow path (not shown) for the resin being extruded. The structure of the die per se forms no part of the present invention and thus is not more specifically illustrated and described herein.

Positioned adjacent the discharge end of the die 15 is a container or vessel 16 containing a quantity of water or like cooling fluid 17. As clearly shown in FIG. 1, the lowermost or discharge end of the die 15 is spaced from the upper surface of the water 17 to provide an air gap or space 18 of about ¼" in height, and for the purpose of preventing the formation of large ripples in the water (which could lead to variations in the height of the air space) there is provided at the front end of the die a baffle or dam 19.

Rotatably journaled in the water bath 16—17 in any suitable manner is an idler roll 20 about which the extruded film is to be passed, as will be more fully explained hereinafter. Referring to FIG. 2, it will be seen that the roll 20 comprises a substantially cylindrical, tubular body 21 which is open at its opposite ends. Fixedly mounted in each of the opposite ends of the roll body 21 is a disc 22 from the outer surface of which projects a trunnion or axle member 23 by means of which the roll is mounted in its bearings within the vessel 16. In accordance with the present invention, furthermore, the roll body 21 is provided adjacent each of its ends with a portion 24 of enlarged diameter. As shown at the left hand end of FIG. 2, each portion of enlarged diameter may be constituted by a sleeve 25 fitted tightly on and rigidly attached to the body of the roll.

In accordance with the preferred manner of practicing the present invention, both the roll body 21 and the sleeves 25 are made of metal and chrome plated to a mirror finish in order to avoid any possibility of an uneven drag or undesired frictional forces being exerted on the extruded film as the same passes about the roll 20. It will, of course, be understood that other materials may be used in lieu of chrome plated metal. In fact, it is entirely possible and contemplated by the present invention that the portions 24 of enlarged diameter may be formed of means other than sleeves. Merely by way of example, these portions may be built up of metallic or plastic tapes or ribbons wound unto the roll body ends. Alternatively, the enlarged diameter portions 24 may be integral parts of the tube body 21 with the reduced diameter of the central portion of the latter being formed by subjecting the roll body 21 to a turning operation on a lathe.

In putting the present invention into practice, it has further been found that certain of the dimensional characteristics of the wrinkle-preventing roll 20 are desirable for the purpose of attaining optimum results. Best results have been obtained by employing a roll 20 having an outer diameter at its center portion of two inches and a sleeve thickness (radial) of about 15 to 65 mils, producing a speed at the edges of the film which is about 1.5–6.5% higher than at the central portion. The roll is positioned with its axis three inches below the water line in the vessel 16. If necessary, an additional baffle system (not shown) may be arranged in the water bath to reduce excessive turbulence.

Referring now again to FIG. 1, it will be seen that the remainder of the extrusion system comprises a first pair of driven rolls 26 and 27 and a second pair of driven rolls 28 and 29, as well as a plurality of idler rolls 30, 31, 32 and 33.

In a specific embodiment, a batch of raw resin (e.g. a polyethylene homopolymer having a density of 0.950 and a melt index of 5.0) is introduced into the extruder 10 and is moved therealong by the extruder screw 11 which reduces the resin to a melt adjacent the discharge end of the screw with the aid of a plurality of band heaters (not shown). The melt, which at this time is at a temperature of about 550° F. to 600° F., and preferably at a temperature of about 575° F., then passes through the screen and breaker plate arrangement 12 and then through the passageway 13 of the attachment 14 into the die 15. If desired, additional heaters may be associated with the die to ensure that the temperature of the resin melt therein never drops below the proper and predetermined operating temperature.

The resin leaves the die 15 in the form of a web 34 approximately 20 mils thick and 5 feet wide and passes through the air space 18 into the water bath 17 which is maintained at a temperature of between about 70° and about 120° F. The web or film 34 is quenched and hardened in the water 17 and passed around the idler roll 20 and then between the driven rolls 26—27 which are driven at a sufficiently high peripheral speed to reduce the gauge of the film to about 1 mil. (In passing from the die to the idler roll the film necks down in width by about ½" at each edge.) Thereafter the film 34 passes between the driven rolls 28—29 which are driven at a somewhat higher peripheral speed than the rolls 26—27 in order to maintain the proper tension on the film. Finally, the film passes over the idler rolls 30, 31, 32 and 33 and is wound up on a take-up roll or spool 35.

It will be understood that as the film 34 is drawn about the idler roll 20, the lateral edges of the film web will travel at a greater peripheral speed than the central portion of the web due to the greater radius of the roll at its opposite ends than in its center. The arrangement is such that the formation of wrinkles in the film is for all practical purposes completely eliminated, and it has been found in actual practice that film speeds of up to 15,000 feet per hour (at the driven rolls 26, 27) could be maintained without entailing any formation of wrinkles in the film as has heretofore been common.

While the invention has been described in detail with respect to a particular resin and particular film-forming conditions it is to be understood that it is applicable to other resins and particularly other high density polyolefin resins and to other conditions without sacrifice in effectiveness.

It is preferred to use polyethylene resins having densities between 0.935 and 0.97 g./ml. and melt indices between about 0.1 and about 10.0. For best results, the density should be between 0.95 and 0.97 and the melt index should be between about 1.8 and 8.0.

The die opening should preferably be maintained between about 2 and about 30 mils (depending on the resin melt index and the screw speed) when the die is in its heated state. The width of the die, in commercial installations will generally range from about 40 to about 70 inches.

Idler roll 20 will ordinarily have a diameter between about 2 and about 4 inches and will rotate at a rate governed by the speed of the film at its circumference (i.e. a speed higher than the extrusion speed at the mouth of the die and lower than the speed at driven rolls 26—27).

Rolls 26—27 are driven at a rate which is correlated with the die opening to produce film of desired thickness, generally between about 0.50 and 3.0 mils. In practical operation rolls 26—27 are generally driven at a peripheral speed of between about 9,000 and about 12,000 feet per hour.

The removal of the tendency to form wrinkles, in accordance with the present invention, facilitates film production techniques considerably and leads to a number of beneficial results. The film, being completely smooth over its entire expanse, can be easily wound into rolls of good appearance and is not beset by the normally encountered heat seal handling problems. Thus a wrinkle-free film produced in accordance with the present invention will be less expensive to produce and thus more readily marketable than extruded high density polyolefin films previously known, and the possibility of great quantities of film having to be discarded as unusable will no longer arise.

It is to be understood that the foregoing detailed description is merely given by way of illustration and that many variations may be made therein without departing from the spirit of my invention.

Having described my invention, what I desire to secure by Letters Patent is:

1. In the process of producing resinous films; the steps of extruding the source material from a die into flat film form and drawing the lateral edges of said formed film away from said die at a greater longitudinal speed than the central portion of said film so that the formation of wrinkles in the extruded film is avoided.

2. In the process of extruding resinous films; the step of passing the extruded film through a quench bath with the lateral edges of said film moving at a greater longitudinal speed than the central portion of said film so that the formation of wrinkles in the extruded film is avoided.

3. In the process of extruding high density polyolefin films; the step of moving the lateral edges of the film subsequent to the extrusion thereof at a 1.5 to 6.5% greater longitudinal speed than the central portion of said film to prevent wrinkle formation in said film.

4. In the process of claim 3; said film-moving step comprising passing said film about a roll the diameter of which is greater at its opposite end regions than at its center to thereby attain the desired speed differential.

5. In the process of claim 4, the further step of passing said film through a water bath concurrently with the movement of said film about said roll.

6. In the process of claim 5, said film-moving step being carried out prior to the reduction of the film gauge to its ultimate value.

7. The process of producing high density polyolefin films, comprising the steps of extruding a melt of the olefin material into the form of a film, passing the extruded film through a water bath maintained at a temperature substantially lower than that of said melt to thereby harden said extruded film, moving the latter while in said bath along an arcuate path in such a manner as to move the lateral edge regions of said film at a 1.5 to 6.5% greater linear speed than the remaining central region of said film, and thereafter subjecting said film, while removing the same from said bath, to a tensile force sufficient to reduce the film gauge to the desired final value.

8. A film extrusion system, comprising extruder means for melting and advancing a mass of film-forming material, die means connected with said extruder means for defining a narrowing material flow path to impart to said material in film form a preliminary thickness, a quench bath adjacent the discharge end of said die means for receiving the extruded film from said die means and for hardening said film, first roll means for drawing said film through and out of said bath while reducing the thickness of said film, and second roll means located in said bath for rolling engagement with said film while in and moving through said bath, said second roll means being constructed to effect an overdrive of the lateral edge regions of said film relative to the central region of the latter so that the formation of wrinkles in said film is prevented.

9. A film extrusion system according to claim 8, said second roll means comprising an idler roll consisting of a substantially cylindrical body having a greater radius at its opposite end regions than at its center region.

10. A film extrusion system according to claim 9, said idler roll being located with the uppermost portion of said body a short distance below the level of the quenching liquid in said quench bath so as to minimize the occurrence of turbulence of said water at the point of entry of said film into said bath.

11. A film extrusion system according to claim 9, said idler roll having a radius of about 1 inch at said center region and a radius approximately 15 to 65 mils greater at said end regions.

12. A film extrusion system according to claim 11, said idler roll being located with its axis about 2 inches below the level of water in said bath.

13. A high density polyolefin film-producing system, comprising means for extruding a quantity of the olefin material into the form of a film, a water bath positioned adjacent the discharge portion of said extruding means for receiving the extruded film, means for drawing said film through and out of said water bath so as to reduce the thickness of said film to the final desired value thereof, and means located within said water bath and engageable with said film passing therethrough to effect overdrive of the lateral edge regions of said film relative to the central region thereof so that the formation of wrinkles in said film subsequent to the extrusion thereof is prevented.

14. A film-producing system according to claim 13, said wrinkle-preventing means comprising at least one roll journaled in said water bath for rolling contact with said film, the center region of said roll having a smaller diameter than the opposite end regions of said roll.

References Cited in the file of this patent

UNITED STATES PATENTS

| | | |
|---|---|---|
| 2,074,285 | Studt et al. | Mar. 16, 1937 |
| 2,240,274 | Wade | Apr. 29, 1941 |
| 2,276,305 | Hershberger | Mar. 17, 1942 |
| 2,311,755 | Hutchingson et al. | Feb. 23, 1943 |
| 2,668,988 | Bailey et al. | Feb. 16, 1954 |
| 2,698,463 | Conwell et al. | Jan. 4, 1955 |
| 2,702,406 | Reed | Feb. 22, 1955 |
| 2,767,435 | Alles | Oct. 23, 1956 |
| 2,804,652 | Balkan | Sept. 3, 1957 |
| 2,940,126 | Sheridan | June 14, 1960 |

FOREIGN PATENTS

| | | |
|---|---|---|
| 788,789 | Great Britain | Jan. 8, 1958 |